United States Patent
Mathews

(10) Patent No.: US 11,509,567 B2
(45) Date of Patent: *Nov. 22, 2022

(54) IP-BASED MATCHING SYSTEM

(71) Applicant: CSAA Insurance Services, Inc., Walnut Creek, CA (US)

(72) Inventor: Daniel L. Mathews, Scottsdale, AZ (US)

(73) Assignee: CSAA Insurance Services, Inc., Walnut Creek, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/551,574

(22) Filed: Dec. 15, 2021

(65) Prior Publication Data

US 2022/0109621 A1    Apr. 7, 2022

Related U.S. Application Data

(63) Continuation of application No. 17/088,503, filed on Nov. 3, 2020, now Pat. No. 11,233,723, which is a continuation of application No. 16/239,115, filed on Jan. 3, 2019, now Pat. No. 10,868,753.

(51) Int. Cl.
*H04L 45/12* (2022.01)
*H04L 61/5007* (2022.01)
*H04L 61/00* (2022.01)

(52) U.S. Cl.
CPC .............. *H04L 45/12* (2013.01); *H04L 61/35* (2013.01); *H04L 61/5007* (2022.05)

(58) Field of Classification Search
CPC ...... H04L 45/15; H04L 61/5007; H04L 61/35
See application file for complete search history.

(56) References Cited

U.S. PATENT DOCUMENTS

| | | | |
|---|---|---|---|
| 7,376,714 B1 * | 5/2008 | Gerken | G06Q 30/02 709/219 |
| 10,091,312 B1 * | 10/2018 | Khanwalkar | H04L 67/306 |
| 10,572,658 B2 | 2/2020 | Boutnaru | |
| 11,233,723 B2 * | 1/2022 | Mathews | H04L 45/12 |
| 11,240,197 B2 * | 2/2022 | Sayko | H04L 69/329 |
| 2007/0014241 A1 | 1/2007 | Banerjee et al. | |
| 2014/0068023 A1 | 3/2014 | Arickan | |

(Continued)

OTHER PUBLICATIONS

Whatismyipaddress.com; "Why Is Your IP Address Broken Into Four Sections"; 2017, 2 pages (Year: 2017).

(Continued)

*Primary Examiner* — Jerry B Dennison
(74) *Attorney, Agent, or Firm* — McDonnell Boehnen Hulbert & Berghoff LLP

(57) ABSTRACT

In one aspect, an example method includes (i) accessing, by a computing device, a first Internet Protocol (IP) address that encodes first attributes of a first profile; (ii) accessing, by the computing device, a second IP address that encodes second attributes of a second profile; (iii) comparing, by the computing device, the first IP address and the second IP address using a network layer communication function; (iv) determining, by the computing device, that a result of the comparing satisfies a threshold condition; and (v) based on the result of the comparing satisfying the threshold condition, providing, by the computing device to another device, an indication of a match between the first profile and the second profile.

20 Claims, 6 Drawing Sheets

(56) References Cited

U.S. PATENT DOCUMENTS

| | | | |
|---|---|---|---|
| 2016/0301779 A1 | 10/2016 | Cui et al. | |
| 2016/0380954 A1 | 12/2016 | Dugan et al. | |
| 2017/0070764 A1 | 3/2017 | Massoudi | |
| 2017/0104724 A1 | 4/2017 | Hellam et al. | |
| 2017/0366455 A1 | 12/2017 | Pongracz et al. | |
| 2018/0077471 A1 | 3/2018 | Takahashi et al. | |
| 2018/0109424 A1 | 4/2018 | Krishnaswamy et al. | |
| 2018/0211037 A1 | 7/2018 | Boutnaru | |
| 2018/0343192 A1 | 11/2018 | Antonyraj et al. | |
| 2020/0220804 A1 | 7/2020 | Mathews | |
| 2021/0176206 A1* | 6/2021 | Sayko | H04L 61/4511 |
| 2022/0109621 A1* | 4/2022 | Mathews | H04L 45/12 |
| 2022/0124067 A1* | 4/2022 | Sayko | H04L 61/5007 |

OTHER PUBLICATIONS

Moy, Network Working Group; RFC 2328; "OSPF Version 2"; Apr. 1998, 244 pages (Year: 1998).

* cited by examiner

IP-BASED MATCHING SYSTEM

CROSS-REFERENCE TO RELATED APPLICATIONS

This disclosure is a continuation of U.S. patent application Ser. No. 17/088,503 filed on Nov. 2, 2020, which is continuation of, and claims priority to, U.S. patent application Ser. No. 16/239,115 filed on Jan. 3, 2019, the entire contents of each of which are hereby incorporated by reference.

USAGE AND TERMINOLOGY

In this disclosure, unless otherwise specified and/or unless the particular context clearly dictates otherwise, the terms "a" or "an" mean at least one, and the term "the" means the at least one.

In this disclosure, the term "connection mechanism" means a mechanism that facilitates communication between two or more components, devices, systems, or other entities. A connection mechanism can be a relatively simple mechanism, such as a cable or system bus, or a relatively complex mechanism, such as a packet-based communication network (e.g., the Internet). In some instances, a connection mechanism can include a non-tangible medium (e.g., in the case where the connection is wireless).

In this disclosure, the term "computing system" means a system that includes at least one computing device. In some instances, a computing system can include one or more other computing systems.

BACKGROUND

In the context of a computer-based system, it can be desirable for the system to compare two data sets to determine whether a match exists so that the system can perform a responsive action.

For example, consider a scenario where a system includes a first client, a second client, and a server, all connected by a packet-based network, such as the Internet. A client-side roommate matching application can be installed on each client, and a corresponding server-side application can be installed on the server. Based on information input by a first user, the first client can generate a first user profile. The first profile can include various types of information, such as an indication of whether the first user is a smoker or whether the first user is seeking more than one roommate, for instance. In the same way, the second client can generate a second user profile.

The server can then determine that the first profile "matches" the second profile so that the server can perform a responsive action, such as sending messages to both users, suggesting that they connect and consider being roommates. To allow the server to determine that such a match exists, the first client can send to the server the first profile as an "application level" communication function (e.g., as an "application layer" function, according to the Open Systems Interconnection (OSI) model). For example, the first client can send the first profile to the server in the form of a plain text file using the application's API. The second client can send the second profile to the server in the same way. After receiving the two user profiles, the server can compare the user profiles and determine that a match exists based on the profiles being sufficiently similar according to a set of predefined rules. Based on the server determining that a match exists, the server can perform a responsive action.

This approach can present some issues, however. For instance, this approach can create security risks. As one example, malware residing on one of the clients can intercept and misuse the user profile as the user profile is being sent to the server. Likewise, malware residing on the server can intercept and misuse the user profiles as the user profiles are being received from the clients. Another potential issue is that comparing data in this way can be computationally expensive, thus resulting in a significant burden on computing resources. Improvements are therefore desired.

SUMMARY

In one aspect, an example computer-implemented method is disclosed. The computer-implemented method includes (i) accessing, by a computing device, a first Internet Protocol (IP) address that encodes first attributes of a first profile; (ii) accessing, by the computing device, a second IP address that encodes second attributes of a second profile; (iii) comparing, by the computing device, the first IP address and the second IP address using a network layer communication function; (iv) determining, by the computing device, that a result of the comparing satisfies a threshold condition; and (v) based on the result of the comparing satisfying the threshold condition, providing, by the computing device to another device, an indication of a match between the first profile and the second profile.

In another aspect, an example non-transitory computer-readable medium is disclosed. The non-transitory computer-readable medium has stored thereon program instructions that upon execution by a processor, cause performance of a set of acts comprising (i) accessing a first IP address that encodes first attributes of a first profile; (ii) accessing a second IP address that encodes second attributes of a second profile; (iii) comparing the first IP address and the second IP address using a network layer communication function; (iv) determining that a result of the comparing satisfies a threshold condition; and (v) based on the result of the comparing satisfying the threshold condition, providing, to another device, an indication of a match between the first profile and the second profile.

In still another aspect, an example computing system is disclosed. The computing system is configured for performing a set of acts including (i) accessing a first IP address that encodes first attributes of a first profile; (ii) accessing a second IP address that encodes second attributes of a second profile; (iii) comparing the first IP address and the second IP address using a network layer communication function; (iv) determining that a result of the comparing satisfies a threshold condition; and (v) based on the result of the comparing satisfying the threshold condition, providing, to another device, an indication of a match between the first profile and the second profile.

DETAILED DESCRIPTION

I. Overview

Figure 1:
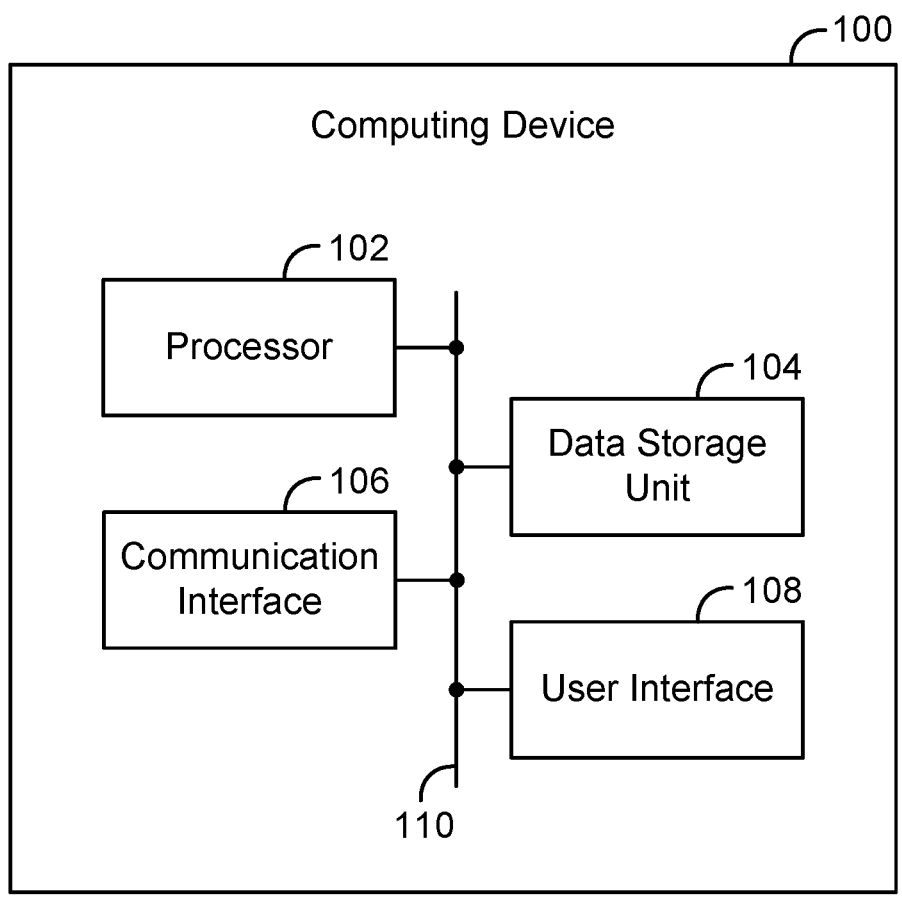
FIG. 1 is a simplified block diagram of an example computing device.

Disclosed herein are computer-based systems and corresponding methods that help address the above-referenced issues and potentially other issues. In an example system, a computing device can compress first attributes of a first profile and encode the compressed first attributes as a first IP address. For instance, the computing device can encode the first attributes into different respective octets, and repurpose the octets as portions of the first IP address. The computing device can then store the first IP address in an SDN table. Similarly, attributes of one or more other profiles can be compressed and encoded as respective IP addresses, and stored in the SDN table.

The computing device can also carry out one or more matching operations and do so at the network layer. By way of example, the computing device can compare, using a network layer communication function, the first IP address and a second IP address that is stored in the SDN table. The network layer communication function can, for instance, include a function that calculates a shortest path between the first IP address and the second IP address in accordance with IP routing information stored in the SDN table. Further, the computing device can determine that a result of the comparing satisfies a threshold condition and, based on the result of the comparing satisfying the threshold condition, provide to the client device an indication of a match between the first profile and the second profile. The first IP address and the second IP address need not be identical for the computing device to identify the first profile as matching the second profile. Rather, as described herein, the computing device can identify the first profile and the second profile as matching based on a relationship between the first IP address and the second IP address satisfying one or more predefined rules. In some instances, a portion of the first IP address may overlap with a portion of the second IP address (e.g., the first IP address and the second IP address may have a same numerical value for one or more octets). However, this example is also not meant to be limiting. In some instances, the first IP address and the second IP address might not have any octets that are the same.

Advantageously, due to the encoding of the attributes of the profiles as IP addresses, it is difficult for devices outside of the system to make practical use of the IP addresses. For instance, even if malware installed on the client devices or the server devices intercepts the IP addresses as they are being sent or received, the IP addresses would effectively be useless to the malware without the malware knowing how the IP addresses are encoded. Hence, the system can help reduce the security risks identified above.

Moreover, because the system makes comparisons using network layer functions as opposed to application layer functions (which themselves invoke other functions of other layers), the computational expense of the system's matching operations is less than that of other matching systems that utilize application layer functions for comparisons, thereby reducing the drain on computing resources.

Various other features of the system, as well as example methods and uses for the system, are described hereinafter with reference to the accompanying figures.

II. Example Architecture

A. Computing Device

Referring now to FIG. 1, a simplified block diagram of an example computing device 100 is illustrated. Computing device 100 can perform various acts and/or functions, such as those described in this disclosure. Computing device 100 can include various components, such as processor 102, data storage unit 104, communication interface 106, and/or user interface 108. These components can be connected to each other (or to another device, system, or other entity) via connection mechanism 110.

Processor 102 can include a general-purpose processor (e.g., a microprocessor) and/or a special-purpose processor (e.g., a digital signal processor (DSP)).

Data storage unit 104 can include one or more volatile, non-volatile, removable, and/or non-removable storage components, such as magnetic, optical, or flash storage, and/or can be integrated in whole or in part with processor 102. Further, data storage unit 104 can take the form of a non-transitory computer-readable storage medium, having stored thereon program instructions (e.g., compiled or non-compiled program logic and/or machine code) that, when executed by processor 102, cause computing device 100 to perform one or more acts and/or functions, such as those described in this disclosure. As such, computing device 100 can be configured to perform one or more acts and/or functions, such as those described in this disclosure. Such program instructions can define and/or be part of a discrete software application. In some instances, computing device 100 can execute program instructions in response to receiving an input, such as from communication interface 106 and/or user interface 108. Data storage unit 104 can also store other types of data, such as those types described in this disclosure.

Communication interface 106 can allow computing device 100 to connect to and/or communicate with another entity according to one or more protocols. In one example, communication interface 106 can be a wired interface, such as an Ethernet interface or a high-definition serial-digital-interface (HD-SDI). In another example, communication interface 106 can be a wireless interface, such as a cellular or WI-FI interface. In this disclosure, a connection can be a direct connection or an indirect connection, the latter being a connection that passes through and/or traverses one or more entities, such as such as a router, switcher, or other network device. Likewise, in this disclosure, a transmission can be a direct transmission or an indirect transmission.

User interface 108 can facilitate interaction between computing device 100 and a user of computing device 100, if applicable. As such, user interface 108 can include input components such as a keyboard, a keypad, a mouse, a touch-sensitive panel, a microphone, and/or a camera, and/or output components such as a display device (which, for example, can be combined with a touch-sensitive panel), a sound speaker, and/or a haptic feedback system. More generally, user interface 108 can include hardware and/or software components that facilitate interaction between computing device 100 and the user of the computing device 100.

Computing device 100 can take various forms, such as a server device, a workstation terminal, a desktop computer, a laptop, a wearable computer, a tablet, or a mobile phone.

B. IP-Based Matching System

Figure 2:
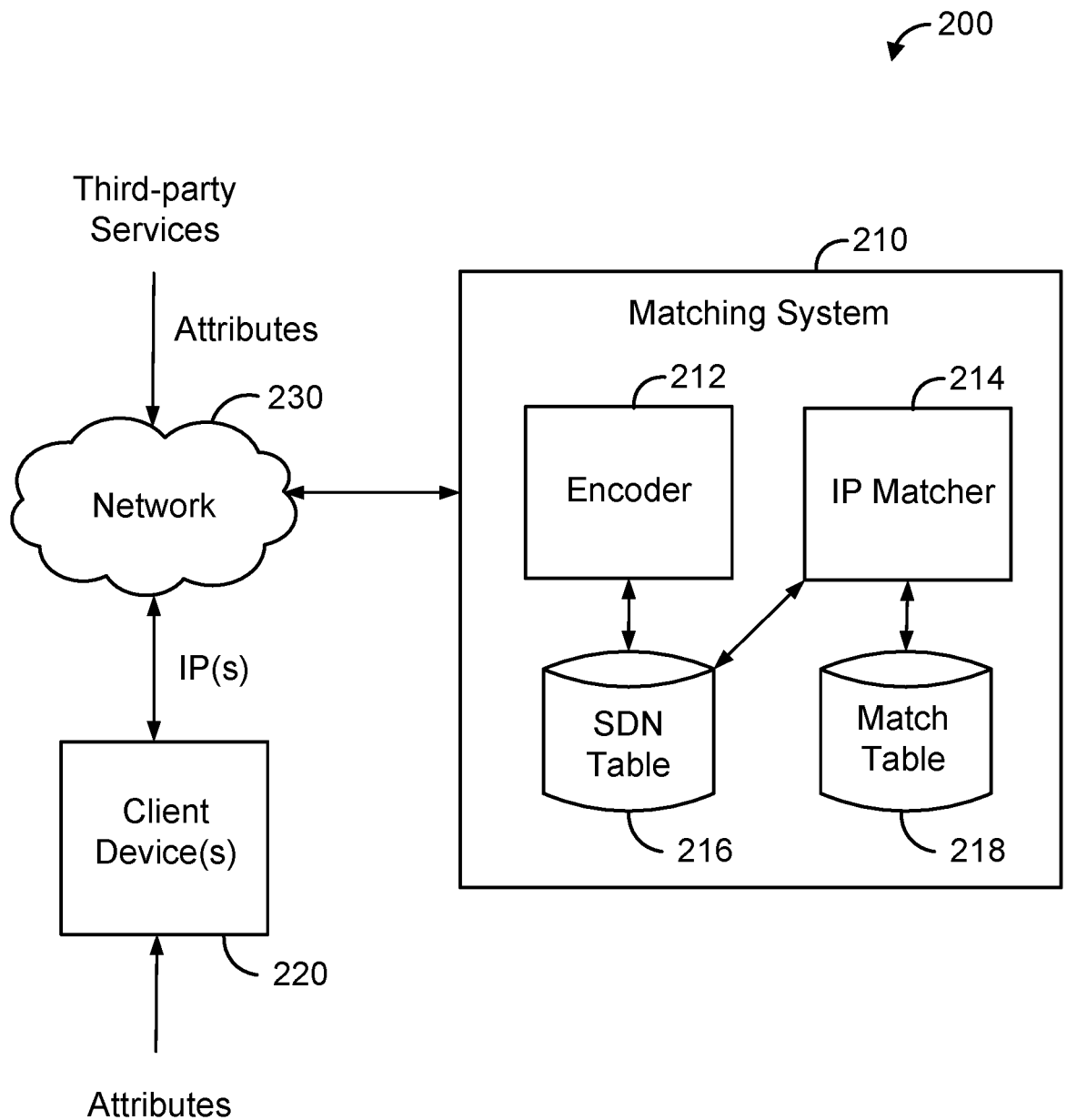
FIG. 2 is a simplified block diagram of an example system.

FIG. 2 is next a simplified block diagram of an example system 200.

System 200 can include various components configured to carry out the various functions described herein. More particularly, as shown in FIG. 2, system 200 includes a matching system 210, one or more client devices 220, and a network 230. Matching system 210 and client device 220 can be implemented as computing devices or systems, such as computing device 100 of FIG. 1. Further, network 230 may be any network that enables communication between devices, such as a wired network and/or a wireless network.

In line with the discussion above, matching system 210 can be configured to compare a first IP address to a plurality of other IP addresses and, upon identifying a second IP address for which a result of the comparing with the first IP address satisfies a threshold condition, matching system 210 or another device can then perform a responsive action. Matching system 210 includes, by way of example, an encoder 212 and an IP matcher 214, as well as one or more storage mediums configured to store an SDN table 216 and a match table 218. One or more of the modules of matching system 210 can be implemented using hardware (e.g., a processor of a machine, a field-programmable gate array (FPGA), or an application-specific integrated circuit (ASIC), or a combination of hardware and software. Moreover, any two or more of the modules of matching system 210 can be combined into a single module, and the function described herein for a single module can be subdivided among multiple modules.

Encoder 212 can be configured to encode attributes of a profile into an IP address. As referred to herein, a profile can include any set of data that is descriptive of a person, a place (e.g., a business), a tangible object, or a virtual object. Some examples of profiles include social media accounts, webpages, and device profiles. Accordingly, the attributes of a profile can take various forms, and can include one or more modalities of data, such as text, images, audio, or video.

Figure 3:
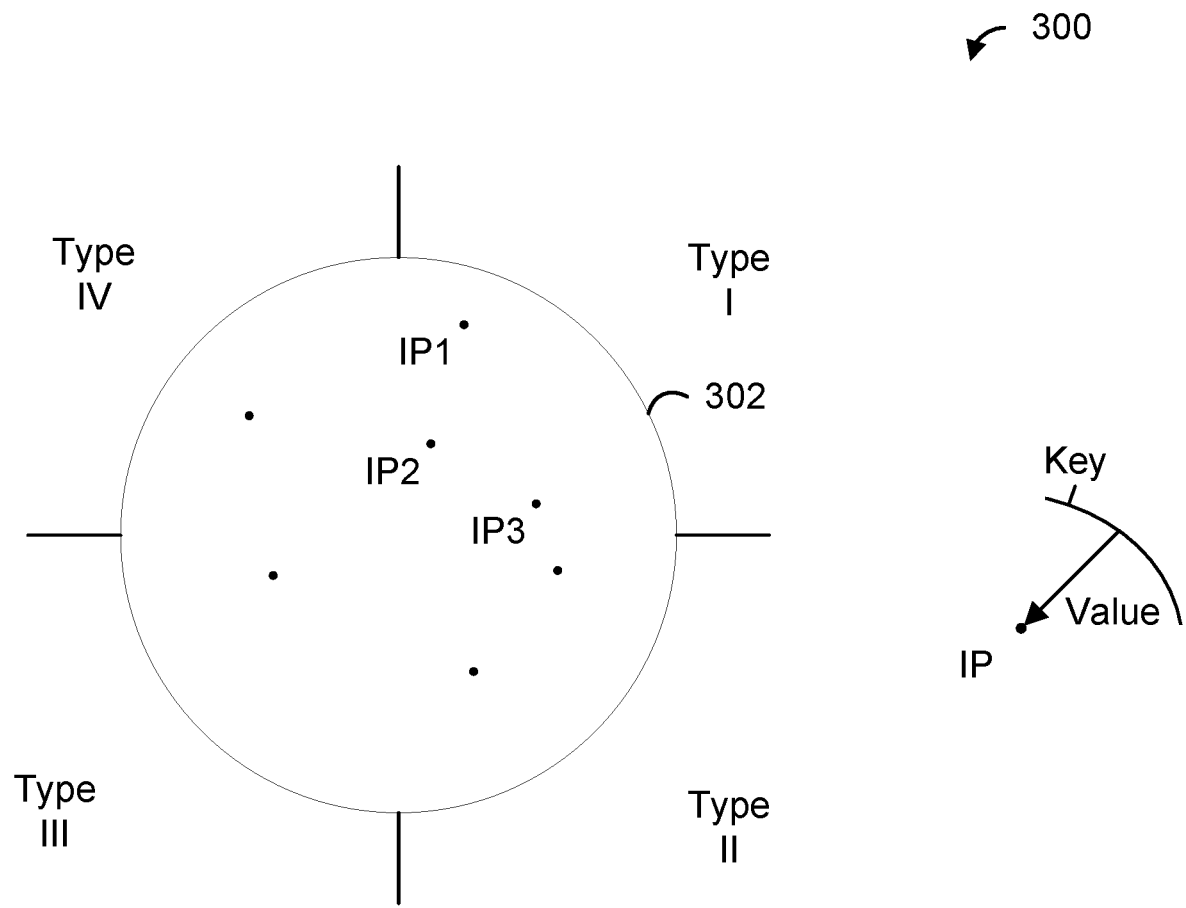
FIG. 3 is a conceptual illustration of a key-value octet data interchange format.

Encoder 212 can encode attributes of a profile as an IP address in various ways. As one example, encoder 212 can encode attributes of a profile as an IP address using a key-value octet data interchange format. FIG. 3 is a conceptual illustration 300 of a key-value octet data interchange format. As shown in FIG. 3, in some examples, an IP address can represent one or more of four different types of attributes. In the conceptual illustration 300 of FIG. 3, three different IP addresses are shown. For ease of explanation, each IP address is shown within one of four quadrants, which is indicative of each IP address encoding only one type. In practice, however, the quadrants can be overlapping (e.g., be stacked on top of one another), and a single IP address can encode more than one type.

Each type can include one or more possible keys that are a subset of the type. Attributes of a profile that are subsets of a type can be represented by a key-value pair within the type. The key of the key-value pair can be a field name, and the value of the key-value pair can include a value corresponding to the field name. The value of the key-value pair can be encoded into an octet of an IP address.

In the conceptual illustration 300 of FIG. 3, each IP address is positioned at a respective position within the region 302, and the respective position is indicative of the key and value of an attribute. The angular position of the position is indicative of the key for the attribute encoded by the IP address, and the distance from the circumference of the region 302 to the position is indicative of the value of the attribute. With this definition, a first IP address "IP1" and a second IP address "IP2" both encode respective attributes that are of the same type and have the same key. However, IP1 and IP2 encode different values of the attribute. A third IP address "IP3" encodes an attribute of the Type I as well, but the attribute encoded by IP3 has a different key and different value.

One possible type of an attribute is location. An example key for location is city. For a profile having Los Angeles specified as a city, the value of Los Angeles could be encoded in an octet of an IP address, with the octet corresponding to the location type. Encoding the value of "Los Angeles" as an octet can involve converting the phrase "Los Angeles" to a number (e.g., converting the phrase to a Unicode format). Further, the number can then be normalized to a maximum of 8-bits. For instance, the number can be normalized to a number between 0 and 255.

Similarly, values for other types of attributes can be encoded and represented within other octets of an IP address. As described more fully below, other types of attributes include contact (e.g., phone number, email address, URL, social media handle), description (e.g., header, tagline), class (e.g., gender), and post (e.g., most recent social media post), among other possibilities.

The IP address into which the attributes of a profile are encoded can be an IPv4 address or an IPv6 address, depending on the desired implementation. In practice, a system operator can specify parameters that affect the encoding of attributes of a profile using a user interface. For instance, a system operator can select one or more types from a list of types and also select at least one key for each selected type. The system operator can specify the parameters using a user interface of client device 220, for instance, and client device 220 can relay the parameters to matching system 210 by way of network 230.

When a profile includes an image, encoder 212 can compress the image and then encode the compressed image. For instance, encoder 212 can compress an image using compressive sensing and a regularization technique (e.g., l1 regularization). This can result in the data being represented in the form of an equation that includes multiple coefficient-weight pairs. Encoder 212 can truncate the weight portion of each pair, thereby leaving multiple numeric coefficients, which can be repurposed as one or more octets of an IP address. To suit a desired configuration, parameters and/or rules of the regularization technique can be adjusted to allow a desired number of attributes to be represented, and to ensure that an IP address of a desired type/length (e.g., based on the IPv4 or IPv6 standard) is generated. Additionally or alternatively, encoder 212 can convert a profile into an image prior to encoding the attributes. Hence, attributes of a profile can include attributes of an image. Similarly, encoder 212 can compress audio and video of a profile using compressive sensing and a regularization technique.

Attributes of a profile can be retrieved from third-party services. For instance, matching system 210 can use a publically-available application programming interface (API) that provides access to attributes of profiles maintained by a third-party service in order to retrieve the attributes. In one example, a system user can cause matching system 210 to receive the attributes by way of the API. For instance, the system user could control intake of attributes to matching system 210 using a user interface that is provided on client device 220. One example of a third-party service is a social networking service. Other examples are also possible.

One advantage of retrieving attributes from a third-party service is that the attributes need not be stored by matching system 210; after the attributes are retrieved and encoded, the attributes can be deleted from a temporary storage. In this manner, after attributes are encoded, attributes of a profile are not susceptible to being divulged or discovered by an adverse party due to a data attack. Another advantage of retrieving attributes from a third-party service is that the IP addresses that encode attributes can be dynamically updated to account for changes to the attributes. For instance, matching system 210 can periodically retrieve attributes from a third-party service, and update the IP addresses based on the most-recently retrieved attributes.

Attributes of a profile can also be obtained by client device 220. For instance, a user can input attributes of a profile using a user interface provided on client device 220. Further, client device 220 can include an encoder (not shown in FIG. 2). The encoder of client device 220 can be similar to encoder 212, and can encode attributes obtained by client device 220 into an IP address (or multiple IP addresses).

After an IP address is encoded by encoder 212, matching system 210 can store the IP address in SDN table 216. By way of example, matching system 210 can establish an SDN session, such that it can access SDN table 216, and can then store the IP address in SDN table. When storing an IP address (or possibly at another time), matching system 210 can associate metadata with the IP address. The metadata can specify which type or types of attributes are encoded by the IP address. This metadata can be utilized by IP matcher 214 when performing matching operations.

Similarly, for IP addresses encoded by client device 220, client device 220 can store the IP addresses in SDN 216. Client device 220 can establish an SDN session, and store the IP address in SDN table 216 during the SDN session.

Matching system 210 or client device 220 can also obtain a network address corresponding to an IP address that encodes attributes of a profile, and store a correlation between the network address and the IP address in a table, such as SDN table 216 or another table. As an example, the network address can be a public IP address that identifies a location of a host in a network, such as an IP address that is linked to a universal resource locator (URL) of an account record. Client device 220 or matching system 210 can use a stored correlation between a network address and an IP address to perform a responsive action after a match is identified.

An IP address that is stored in SDN table 216 can be directly linked with one or more other IP addresses stored in SDN table 216. For a given IP address, SDN table 216 can store data indicative of one or more other IP addresses to which the given IP address has a direct link.

In one example, a link between a first IP address and a second IP address can be established by matching system 210 based on identification of a link between a first profile that encodes attributes of the first IP address and a second profile that encodes attributes of the second IP address. For instance, the first profile can be a profile on a first social networking service, the second profile can be a profile on a second social networking service, and the first profile can include a link to the second profile. In another example, a link between a first IP address and a second IP address can be established by matching system 210 based on an API query for profiles of a third-party service having a particular attribute. Matching system 210 can establish a source node and corresponding source IP address that encodes the particular attribute. For any profiles that are retrieved due to the API query, matching system 210 can establish a link between the source IP address and an IP address encoding attributes of a retrieved profile. IP matcher 214 can use data indicative of the links when performing one or more matching operations.

IP matcher 214 can be configured to carry out matching operations using one or more network layer communication functions. For example, using SDN table 216, IP matcher 214 can determine whether a match exists between data encoded by a first IP address and data encoded by a second IP address by comparing the IP addresses. Comparing a first IP address and a second IP address can involve consulting routing information in SDN table 216, and applying a shortest path algorithm (e.g., Dykstra's algorithm or the like) to determine a shortest path between the first IP address and the second IP address. In line with the discussion above, the routing information can include information specifying which other IP addresses the first IP address is linked to, which IP addresses are, in turn, linked to those other IP addresses, and so forth. Further, the routing information can also include metadata indicating which types of attributes are encoded by the IP addresses.

Determining a shortest path between a first IP address and a second IP address can involve determining a shortest path subject to a constraint that, the second IP address, taken alone or in combination with one or more route IP addresses along the path, encode each of multiple types of attributes that the first IP address encodes. For instance, if the first IP address encodes four different types of attributes, the shortest path to a second IP address is a shortest path for which the second IP address, taken alone or in combination with one or more route IP addresses along the path, encodes each of the four types of attributes. The second IP address itself could encode each of the four types of attributes, in which case the shortest path could be a single hop (i.e. a direct link between the first IP address and the second IP address). Alternatively, the second IP address could encode three of the four types of attributes, and a third IP address that has a direct link to the first IP address and a direct link to the second IP address could encode the other one of the four types of attributes. In the latter case, the shortest path is two hops.

After determining the shortest path between the first IP address and the second IP address, IP matcher can store information indicative of the shortest path in SDN table 216. IP matcher can be configured to calculate a shortest path between each IP address of SDN table 216 and each other IP address of SDN table 216.

IP matcher 214 can also update match table 218 with IP addresses and associated routes for any source IP addresses having a shortest path to a destination IP address that meets a threshold condition and, therefore, is deemed a match to the source IP address. The threshold condition could be that the shortest path is less than or equal to a threshold number of hops (e.g., one hop, three hops, etc.). Alternatively, a shortest path could satisfy the threshold condition by satisfying the above-referenced constraint regarding attributes represented by IP addresses along the path. In other words, the existence of a shortest path meeting the constraint could be enough to satisfy the threshold condition. Hence, IP matcher 214 can populate match table 218 with a list of source IP addresses and corresponding destination IP addresses that match the source IP address. Where one or more route IP addresses are present along a shortest path between a source IP address and a destination IP address, those route IP addresses can also be specified in the match table 218 for the corresponding destination IP address.

In some examples, data encoded by a source IP address can be matched to data encoded by a destination IP address based on identifying a route that satisfies a threshold condition. A route can be defined as zero or more IP addresses that are derived from the source IP address. As an example, where types t1, t2, and t3 are used for encoding, a route from the source IP address to the destination IP address can satisfy the threshold condition based on the route including IP addresses that, in combination, include types t1, t2, and t3.

For instance, for a route B between IP address A and IP address C, route B can satisfy the threshold condition based on IP addresses of B, in combination, including at least one value for types t1, t2, and t3. Further, the minimum collection of B can be defined as the shortest path between A and B.

Matching system 210 can be deployed in a networking device. For instance, a system operator can specify, via a user interface, multiple types as well as the possible keys that are subsets of the types. The system operator can then send the types and keys to a networking device having embedded SDN capabilities. Further, the system operator can provide to the matching system a source IP address and a destination IP address and designate any third-party derivative source IP addresses. In addition, a root key encryption key (KEK) can be generated and stored on the networking device, and a matching data encryption key (DEK) can be generated and stored on matching system 210. The root KEK and matching DEK can be utilized by the system operator for characterizing a state of matching system 210.

In some examples, multiple parties can have shared access to matching system 210. For instance, a first party can maintain attributes of a group of first profiles, and a second party can maintain attributes of a group of second profiles. The first party can encode attributes of the first profiles as IP addresses and store the IP addresses in SDN table 216. Likewise, the second party can encode attributes of the second profiles as IP addresses and store the IP addresses in SDN table 216. In this manner, the second party can match one of the second profiles to one of the first profiles, without the first party having to directly reveal the attributes of the first profiles to the second party. Upon IP matcher 214 identifying a match between one of the first profiles and one of the second profiles, IP matcher 214 can provide network address corresponding to the first profile to the second party and provide and/or provide a network address corresponding to the second profile to the first party, so that the first party and/or the second party can perform a responsive action.

In such a shared-access system, the first party can utilize one or more of client devices 220 to control and interface with matching system 210, and the second party can utilize one or more of client devices 220 to control and interface with matching system 210.

III. Example Operations

Figure 4:
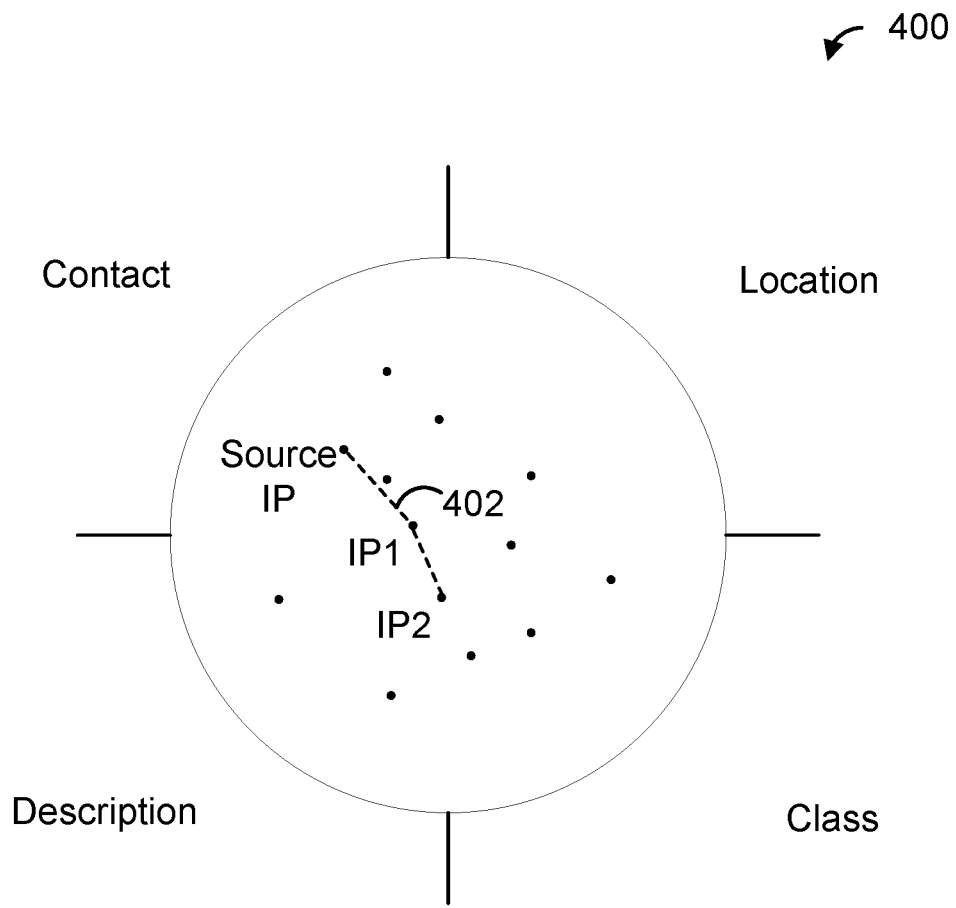
FIG. 4 is a conceptual illustration of another key-value octet data interchange format.

A party seeking to identify a group of potential consumers of a good or service can use matching system 210 to identify such a group. As an example, a party may wish to identify potential consumers to which the party can offer insurance, and for whom the party can obtain one or more attributes for the potential consumer, so that the party can provide the party with a tailored quote based on knowledge of attributes of the consumer. To identify those consumers using matching system 210, a system operator can, for example, designate location as a first type, gender as a second type, description as a third type, and contact as a fourth type. These four types are shown in FIG. 4, which shows a conceptual illustration 400 of another example key value octet data interchange format.

For the location type, the system operator could further define "city" as a key and specify "Walnut Creek" as the value of that key. For the class type, the system operator could define "gender" as a key. For the description type, the system operator could define "occupation" as the key. And for the contact type, the system operator could define "URL" as the key.

The system operator can then establish a source node and corresponding source IP address that encodes "Walnut Creek" as the city key for the location type. Further, the system operator could cause matching system 210 to retrieve attributes of profiles that list Walnut Creek as the city. For example, matching system 210 could, by way of an API of a social networking service, retrieve the URL for any social media accounts that list Walnut Creek as the city and retrieve any current occupation and gender values provided for those social media accounts. If desired, the system operator could further narrow the retrieved results, by way of the API, to any users that have been active in the past month. Upon receiving the attributes, matching system 210 can encode the attributes as IP addresses, and establish a direct link between the source IP address and the encoded IP addresses. For instance, matching system 210 can encode the occupation under the description type, encode the URL under the contact type, and encode the gender under the class type.

The system operator can also cause matching system 210 to retrieve any links to other profiles (e.g., other social media accounts of the same user) that are included in the social media account, and to use an appropriate API to retrieve any occupation or gender values provided in the linked social media account. In this manner, if a user does not list an occupation on a first profile, but provides a link on a first profile to a second profile that does include the occupation, the matching system can retrieve the occupation value from the second profile, as well as a URL for the second profile. The attributes of the second profile can be encoded in a second IP address. Further, the matching system 210 can then define a link between an IP address that encodes attributes of the first profile and an IP address that encodes attributes of the second profile.

During matching, for any of the social media accounts that happen to include values for both gender and occupation, IP matcher 214 can identify IP addresses that encode attributes of those social media accounts as direct matches to the source IP address, due to the inclusion of attributes for all four of the required types. Accordingly, for a given IP address that encodes values for both gender and occupation, the matching system 210 can list, in matching table 218, an indication of a direct route between the source IP address and the given IP address. The system operator can interpret this indication to mean that the given IP address corresponds to a user for which values of the desired information (i.e. location, gender, occupation, and contact) can be obtained by decoding the given IP address.

On the other hand, IP matcher 214 of matching system 210 can also identify matches between source IP address and other IP addresses. For instance, with reference to FIG. 4, IP matcher 214 can identify a shortest path 402 between the source IP address "Source IP" and a second IP address "IP2" by way of a route IP address "IP1". Continuing with the above example, IP1 can encode attributes of a first profile that lists "Walnut Creek" as the city, and is therefore linked to Source IP. In addition, IP2 can encode attributes of a second profile that is linked to by the first profile. Accordingly, IP matcher 214 can list the match between Source IP and IP2 in matching table 218, and indicate the use of IP1 as an route node. The system operator can interpret this indication to mean that IP2 corresponds to a user for which values of the desired information can be obtained by decoding IP2 and IP1.

One of ordinary skill in the art will appreciate that a system operator can also define other links between IP addresses in an SDN table, depending on the desired implementation, which can allow IP matcher 214 to identify additional matches. As an example, a system operator can configure matching system 210 such that for any first IP address having a particular octet (e.g., the first octet) whose value matches (e.g., is equal to or is within a threshold value of) the value of the same octet of a second IP address, a direct link is defined in SDN table 216 between the first IP address and the second IP address.

Matching system 210 can also be used to match a first user of a first service with a second user of a second service in a scenario where preferences of the first user and preferences of the second user are known by the respective services but are not shared between the services. As an example, a first user of ride sharing service A may be seeking a ride from location L1 to location L2 at a time Ti. However, ride sharing service A might not be able to identify a companion that is traveling from location L1 to location L2 at time Ti.

In light of this situation, a computing device coordinating ride sharing for ride sharing service A can encode the location and time attributes as a first IP address, and cause a matching system to compare the first IP address with other IP addresses available in an SDN table that is shared between ride sharing service A and a ride sharing service B. The matching system can determine that a relationship between the first IP address and a second IP address satisfies a threshold condition, and provide a notification of a network address corresponding to the second IP address to the computing device of ride sharing service A. Ride sharing service A can then place the first user in contact with the second user, so the first user and the second user can consider riding together.

Matching system 210 can also be used to provide recommendations in an application store. A given user may have downloaded applications from a first application store using a mobile phone and a given phone number. The given user may then switch mobile carriers but maintain the same phone number. With existing technology, in order for a second application store associated with the new mobile carrier to provide relevant recommendations, the first application store may need to provide metadata regarding the given user to the second application store. This presents security and privacy issues.

With matching system 210, the phone number could be encoded as an IP address using types of country code, area code, prefix, and line, and the IP address can be linked to IP addresses corresponding to one or more applications downloaded by the user. The second application store can be provided with access to the matching table that stores the route information for the IP addresses. After obtaining the phone number and an opt-in from the user, the second application store could then search for applications matching the IP address that encodes the phone number. In some instances, the user can allow the first application store or the second application store access to other phone numbers for contacts stored in the user's phone. These phone numbers can provide an additional source of links between IP addresses. Additionally or alternatively, a system operator can match applications to other applications by encoding attributes of applications using types of attributes such as operating system, region, genre, and cost.

Notably, if data stored within the matching table is discovered by an adverse party, the adverse party would not be able to understand the data without having access to the manner in which the IP addresses were encoded. The stored data would not include personally identifiable information, such as the names of users or phone numbers. Further, such an application recommendation system may involve significantly less computational processing and memory consumption as compared with existing recommendation systems.

Figure 5:
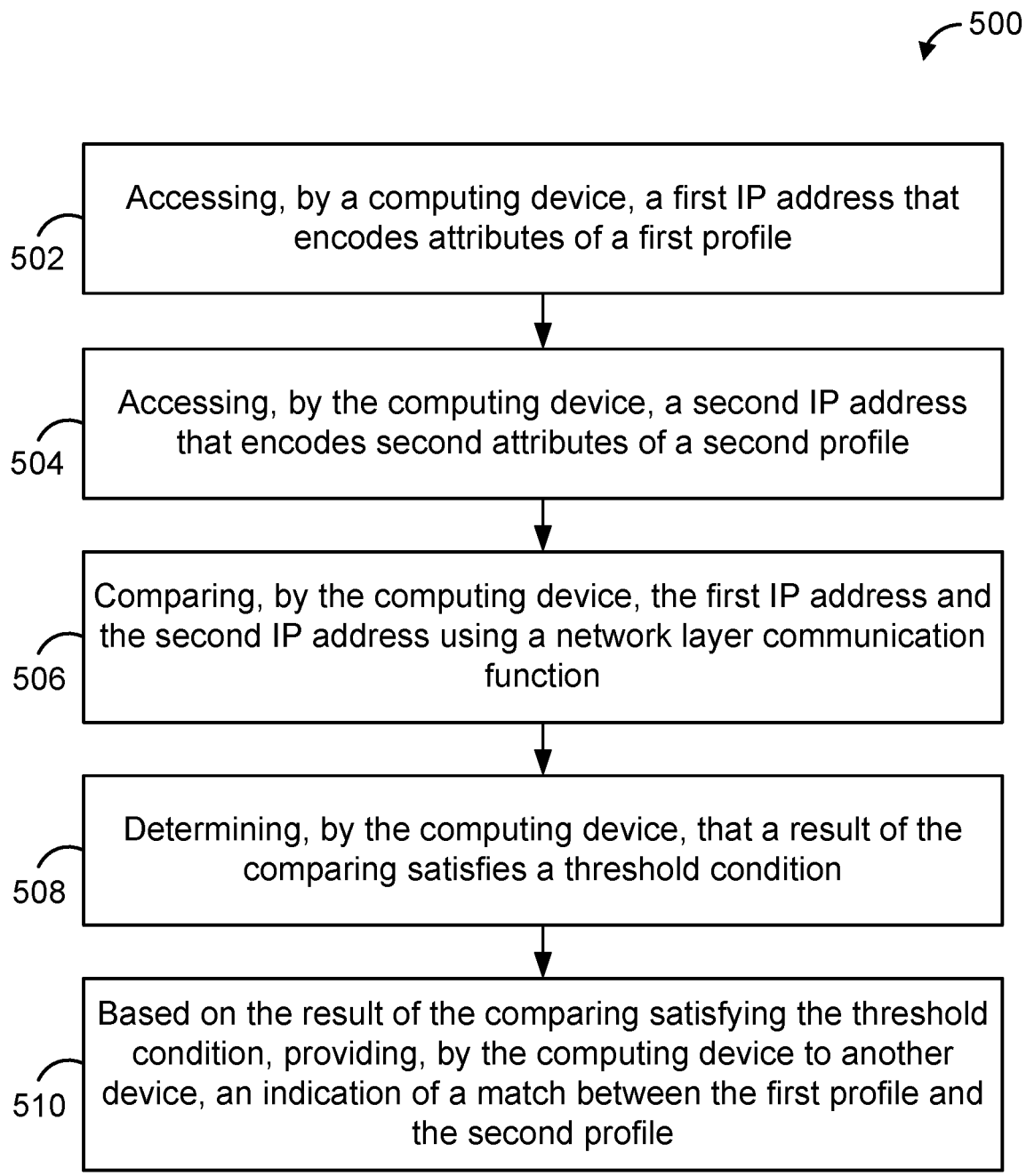
FIG. 5 is a flow chart of an example method.

FIG. 5 is a flow chart of an example method 500. Method 500 can be carried out by a matching system, such as matching system 210, or more generally, by a computing device or computing system. At block 502, method 500 includes accessing, by a computing device, a first IP address that encodes attributes of a first profile. At block 504, method 500 includes accessing, by the computing device, a second IP address that encodes second attributes of a second profile. At block 506, method 500 includes comparing, by the computing device, the first IP address and the second IP address using a network layer communication function. At block 508, method 500 includes determining, by the computing device, that a result of the comparing satisfies a threshold condition. At block 510, method 500 includes, based on the result of the comparing satisfying the threshold condition, providing, by the computing device to another device, an indication of a match between the first profile and the second profile.

Figure 6:
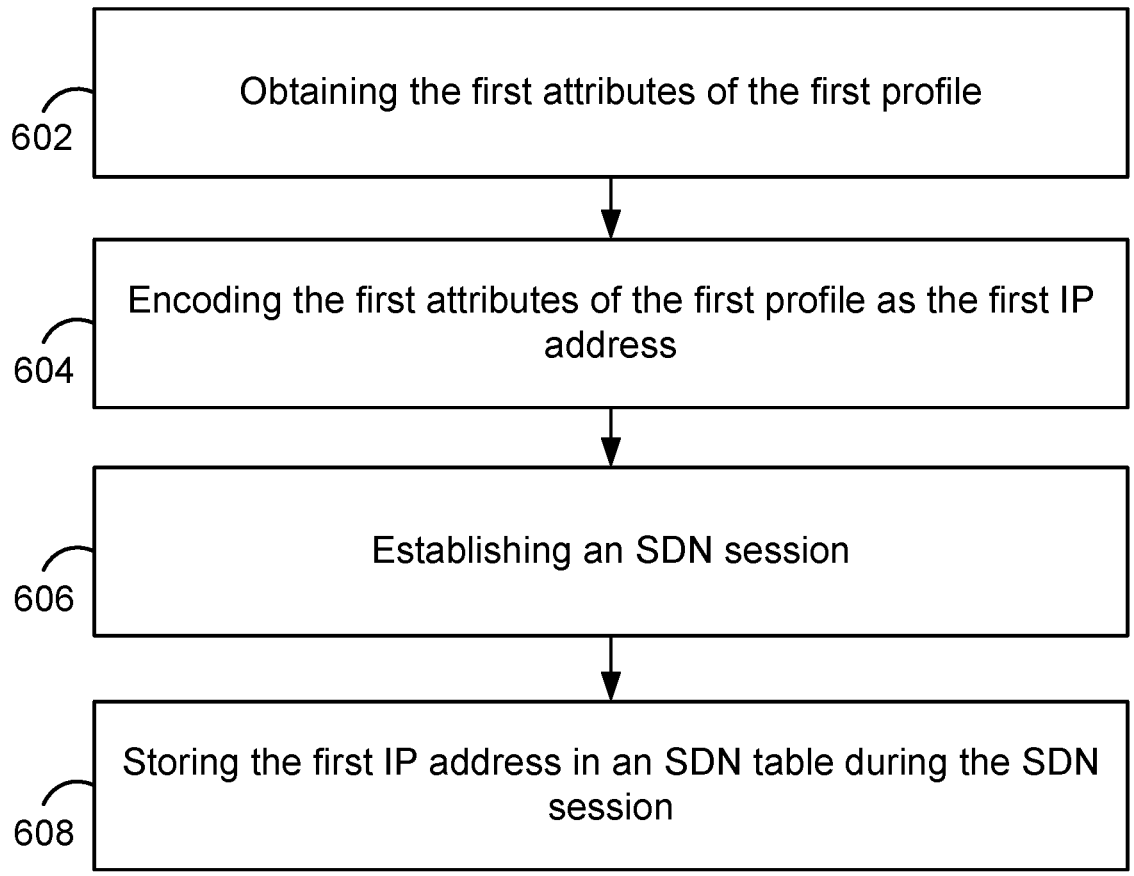
FIG. 6 is a flow chart illustrating additional acts that can be carried out in conjunction with the method shown in FIG. 5.

FIG. 6 is a flow chart illustrating additional acts that can be carried out in conjunction with the method shown in FIG. 6. Blocks 602, 604, 606, and 608 can be carried out prior to block 502 of FIG. 5, for example. Further, blocks 602, 604, 606, and 608 can be carried out by a matching system, such as matching system 210 of FIG. 2, and/or by a client device, such as client device 220 of FIG. 2. Block 602 involves obtaining the first attributes of the first profile. Block 604 involves encoding the first attributes of the first profile as the first IP address. Block 606 involves establishing an SDN session. And block 608 involves storing the first IP address in an SDN table during the SDN session.

IV. Example Variations

Although some of the acts and/or functions described in this disclosure have been described as being performed by a particular entity, the acts and/or functions can be performed by any entity, such as those entities described in this disclosure. Further, although the acts and/or functions have been recited in a particular order, the acts and/or functions need not be performed in the order recited. However, in some instances, it can be desired to perform the acts and/or functions in the order recited. Further, each of the acts and/or functions can be performed responsive to one or more of the other acts and/or functions. Also, not all of the acts and/or functions need to be performed to achieve one or more of the benefits provided by this disclosure, and therefore not all of the acts and/or functions are required.

Although certain variations have been discussed in connection with one or more examples of this disclosure, these variations can also be applied to all of the other examples of this disclosure as well.

Although select examples of this disclosure have been described, alterations and permutations of these examples will be apparent to those of ordinary skill in the art. Other changes, substitutions, and/or alterations are also possible without departing from the invention in its broader aspects as set forth in the following claims.

The invention claimed is:

1. A computer-implemented method comprising:
   accessing, by a computing device, a first Internet Protocol (IP) address that encodes first attributes of a first profile, wherein the first profile is descriptive of a person;
   accessing, by the computing device, a second IP address that encodes second attributes of a second profile, wherein the second profile is descriptive of another person or a place;

comparing, by the computing device, the first IP address and the second IP address using a network layer communication function;

determining, by the computing device, that a result of the comparing satisfies a threshold condition; and based on the result of the comparing satisfying the threshold condition, outputting an indication of a match between the first profile and the second profile.

2. The computer-implemented method of claim 1, wherein comparing the first IP address and the second IP address comprises determining a shortest path between the first IP address and the second IP address.

3. The computer-implemented method of claim 2, wherein determining that the result of the comparing satisfies the threshold condition comprises determining that the shortest path satisfies a threshold condition.

4. The computer-implemented method of claim 2, wherein:

determining the shortest path comprises consulting routing information stored in a software defined network (SDN) table, and the routing information includes metadata indicative of which types of attributes are encoded by the first IP address and which types of attributes are encoded by the second IP address.

5. The computer-implemented method of claim 4:

wherein the first IP address comprises multiple octets, with each octet of the multiple octets encoding a respective attribute of the first attributes, and wherein the second IP address comprises multiple octets, with each octet of the multiple octets encoding a respective attribute of the second attributes.

6. The computer-implemented method of claim 1, wherein the second profile is descriptive of a business.

7. The computer-implemented method of claim 1, wherein:

the first profile is descriptive of a first user of a first service; and the second profile is descriptive of a second user of a second service.

8. The computer-implemented method of claim 7, wherein the first attributes and the second attributes are known by the first service and the second service, respectively, but are not shared between the first service and the second service.

9. The computer-implemented method of claim 1, wherein the comparing the first IP address and the second IP address using the network layer communication function comprises comparing the first IP address and the second IP address using network hardware that is configured to carry out the network layer communication function.

10. The computer-implemented method of claim 9, wherein the networking hardware comprises an application-specific integrated circuit that is configured to carry out the network layer communication function such that a computational expense of the comparing is less than that of other computing devices that utilize application layer functions for comparisons.

11. The computer-implemented method of claim 1:

wherein the first IP address and the second IP address are stored in a software defined network (SDN) table, wherein accessing the first IP address comprises accessing the first IP address in the SDN table, and wherein accessing the second IP address comprises accessing the second IP address in the SDN table.

12. The computer-implemented method of claim 1, further comprising:

obtaining a public IP address corresponding to the first profile; and storing, by the computing device, a correlation between the public IP address and the first IP address.

13. A computing system comprising:

one or more processors; and a non-transitory computer-readable medium having stored therein instructions that are executable to cause the computing system to perform a set of acts comprising:

accessing a first Internet Protocol (IP) address that encodes first attributes of a first profile, wherein the first profile is descriptive of a person, accessing a second IP address that encodes second attributes of a second profile, wherein the second profile is descriptive of another person or a place, comparing the first IP address and the second IP address using a network layer communication function, determining that a result of the comparing satisfies a threshold condition, and based on the result of the comparing satisfying the threshold condition, outputting an indication of a match between the first profile and the second profile.

14. The computing system of claim 13, wherein comparing the first IP address and the second IP address comprises determining a shortest path between the first IP address and the second IP address.

15. The computing system of claim 14, wherein determining that the result of the comparing satisfies the threshold condition comprises determining that the shortest path satisfies a threshold condition.

16. The computing system of claim 14, wherein:

determining the shortest path comprises consulting routing information stored in a software defined network (SDN) table, and the routing information includes metadata indicative of which types of attributes are encoded by the first IP address and which types of attributes are encoded by the second IP address.

17. The computing system of claim 13, wherein the second profile is descriptive of a business.

18. A non-transitory computer-readable medium having stored thereon program instructions that upon execution by a processor, cause performance of a set of acts comprising:

accessing a first Internet Protocol (IP) address that encodes first attributes of a first profile, wherein the first profile is descriptive of a person;

accessing a second IP address that encodes second attributes of a second profile, wherein the second profile is descriptive of another person or a place;

comparing the first IP address and the second IP address using a network layer communication function;

determining that a result of the comparing satisfies a threshold condition; and based on the result of the comparing satisfying the threshold condition, outputting an indication of a match between the first profile and the second profile.

19. The non-transitory computer-readable medium of claim 18, wherein comparing the first IP address and the second IP address comprises determining a shortest path between the first IP address and the second IP address.

20. The non-transitory computer-readable medium of claim 19, wherein determining that the result of the comparing satisfies the threshold condition comprises determining that the shortest path satisfies a threshold condition.

* * * * *